March 21, 1961 G. F. PAPPAS 2,975,919
CONTROL OF COARSE SOLIDS FLOW
Filed Jan. 23, 1959

George F. Pappas  Inventor

By *George J. Silbey*

Attorney

United States Patent Office 2,975,919
Patented Mar. 21, 1961

2,975,919

CONTROL OF COARSE SOLIDS FLOW

George F. Pappas, Westfield, N.J., assignor to Esso Research and Engineering Company, a corporation of Delaware Filed Jan. 23, 1959, Ser. No. 788,626

9 Claims. (Cl. 214—152)

The present invention is concerned with the control of solids flow rate. More particularly, it deals with fine control of rate of coarse solids flow through a standpipe leading to a disperse solids phase zone.

Through the years, the concept of contacting a feed material with a solid particle in order to effect a reaction has assumed increasing importance in both petroleum and chemical technology. By way of example, catalytic cracking, hydroforming, fluid coking, etc. all involve this basic step. In all such solids-contacting processes, it is necessary to convey the solids to and from the reaction zone. Various methods for such solids conveyance and its control have been suggested, for example, screw conveyors, bucket lift, pneumatic systems, etc., operating in conjunction with valves, lock hopper and other mechanical flow control devices.

While fairly effective in controlling the rate of fine particle flow, i.e. solids less than 500 microns in size, the various conventional mechanical control devices have given rise to severe difficulties when used to handle coarse solids. The large sized solids tend to form clusters which block the restricted openings defined by valves. Further, contact between the flowing solids and mechanical parts results in undesirable attrition of the former and rather severe erosion of the latter. Mechanical systems with moving parts are additionally subjected to discontinuities of operation due to wear and tear and a certain amount of unavoidable mechanical defects.

The present invention replaces mechanical devices (valves) as a means for altering solids flow rates. Fine control over coarse solids flow is obtained without incurring the disadvantages of excessive solids attrition, blockage of flow, etc. inherent in mechanical systems. The present invention is particularly advantageous in maintaining low rates of coarse solids flow through a standpipe, such conditions being those encountered in feeding solids to a disperse phase reaction zone.

Briefly summarized, the present invention contemplates flowing coarse solids downwardly from a hopper to a standpipe in response to the force of gravity. Gas is introduced into the lower portion of the standpipe at one or more points in order to impede the downward flow of solids as well as seal off the standpipe and hopper from the gaseous atmosphere of zones beneath the standpipe, i.e. the reactor. Most importantly, a confined, dilute solids phase zone is established along the solids path from the hopper to the standpipe and leads upwardly to the dilute phase of the hopper. Gas is passed through the confined zone so as to educt downflowing coarse solids and to recycle them, by means of the confined zone, back to the hopper. By varying the gas flow through the confined zone or draft tube, varying amounts of downflowing solids can be recirculated back to the hopper. Thus, the more solids recycled, the less the net solids flow rate through the standpipe. Though flowing against an upward gas stream, the solids pass through the standpipe in an unfluidized condition. This is desired since coarse solids fluidize poorly and otherwise any pressure surges from areas below standpipe, i.e. a reaction zone, would push vapors from such areas upwardly into and through the conduit. A dense phase is maintained in the standpipe by introducing gas above and below a section of reduced cross section in the lower portion of the standpipe. When solids flow is decreased, the level of the dense phase in the standpipe is reduced. In response to this, more seal gas will pass up through the reduced area, thus giving a new equilibrium dense phase level.

It is to be clearly understood that the present invention is to be distinguished from merely a selective entrainment process. Simply passing a gas upwardly through a descending solids stream at a uniform velocity across the stream will tend to impede solids flow. However, it requires very high gas rates, and only the coarest solids will flow downwards.

Coarse solids suitable for flow control are over 500 microns in size, and include among others, mullite, sand, coke and catalysts. The solids have a true density of 60 to 150 lbs./ft.$^3$.

By way of clarifying nomenclature, the terms "holdup zone," "conduit section," "passage" or "path" between the "holdup zone" and "conduit section" are to be construed liberally. Thus the "holdup zone" and the "path" leading to the conduit may be part of a single hopper unit or may be separate structures. The term "conduit section" is used merely to connote the solids passageway below the confined or draft tube zone, the exiting solids flow rate of which is to be controlled. Further, the term "unfluidized" as used to characterize the solids in the conduit section denotes that the solids, though aerated, do not possess the properties of a fluid and maintain, on an overall basis, a given direction of flow.

The various aspects of the present invention will be made more clearly apparent by reference to the following description, example and accompanying drawings.

Figure 2 represents a horizontal cross section taken on line 2—2 of Figure 1;

Figure 1:
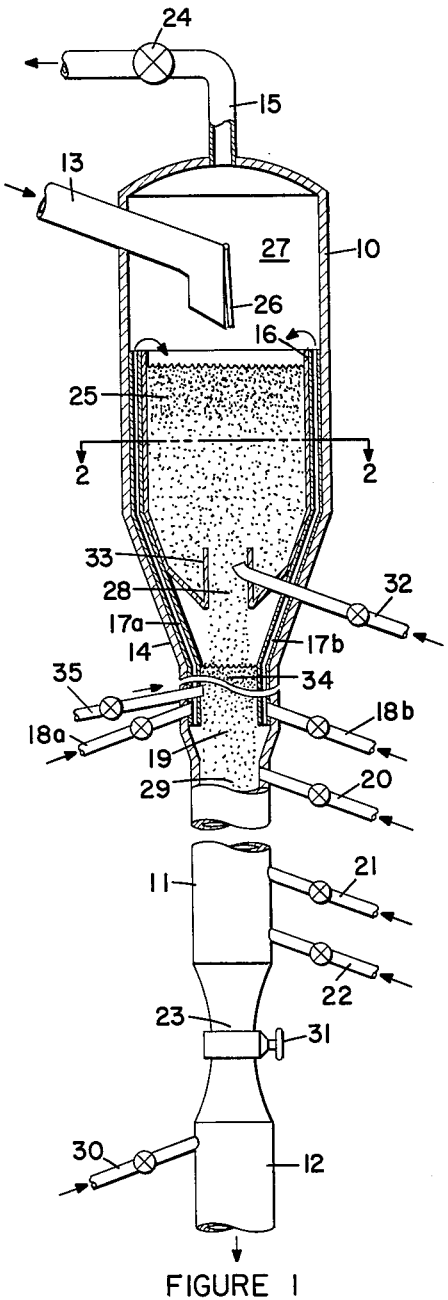
Figure 1 depicts a preferred mode of controlling coarse solids flow rates with relatively little consumption of aeration gas.

Turning to Figure 1, shown therein is a solids system basically comprising hopper 10, inlet conduit 13 leading thereto, and conduit 11, the exiting solids flow rate of which is to be controlled. Though not fully illustrated, the solids introduced into the hopper may arise from a heating vessel, and conduit 11 may serve to introduce solids into a disperse phase reaction zone, e.g. a cracking zone, the top of which is denoted by numeral 12. The present solids flow control system is particularly desirable for introducing solids into such a disperse phase reaction zone since control over inlet solids rate of the order of 2% or less is required therein.

Hopper feed conduit 13 advantageously terminates in trickle valve 26, solids, such as mullite, being discharged onto mass 25 of coarse solids. The solids being handled are over 400 microns in size, primarily ranging from about 500 to 2000 microns. Disperse solids phase 27 is positioned above solids mass 25.

For the purpose of description, the sloping section 14 of vessel 10 will be referred to as the solids passageway leading from the holdup zone (solids mass 25 and disperse phase 27) to the inlet portion of conduit or conduit section 11.

In prior art systems, solids passed from hopper 10 to, and through, conduit 11 with slide valve 31 being at least partially closed and used to control the rate of solids flow through the conduit. However, when employing the present invention, slide valve 31 is left wide open and is only used as an emergency precaution. Since it is wide open, erosion and attrition are negligible.

Figure 2:
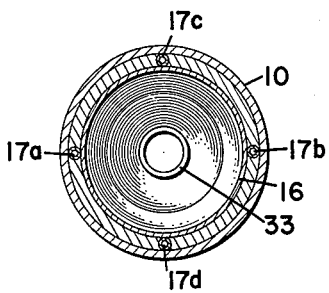
Figure 2 is a cross section of a portion of Figure 1.

In accordance with the present invention, positioned along the path of solids flow is structural element 16 which, together with channel 33, defines the path of feed solids flow as they descend to the inlet portion of conduit 11. Positioned about the circumference of structure 16 is a plurality of tubular paths denoted 17a, 17b, etc. The tubular paths or thin draft tubes extend from the inlet portion 19 of conduit 11 to the disperse phase 27 of hopper. In the present embodiment, four tubes are employed, i.e. 17a, 17b, 17c, and 17d, although the number of tubes is capable of variation. Positioned near the inlet portion of each of the tubes are gas injectors, the injectors being labeled 18a, 18b, etc. to correspond to the draft tubes they serve. A top view of the positioning of the tubes is shown in Figure 2.

Structure 16 terminates in member 33 which defines area 28 through which the coarse hopper solids are discharged into the conduit. Aeration tap 32 is positioned to direct gases into area 28 for flow control as will later be described. Somewhat similarly aeration lines 20, 21 and 22 similarly provide aeration gas.

In the lower portion of conduit 11, there is maintained an area 23 of reduced cross section. In the present embodiment, area 23 has about half the cross section of conduit 11, as measured in area 29. It is formed by means of a gradual tapering of from 5 to 30°. Conveniently positioned about area 23 is slide valve 31, although valve 31 may be placed in other sections of the conduit. Positioned above and below area 23 are aeration taps 22 and 30, respectively.

Reduced cross-sectional area 23 and aeration taps 22 and 30 associated therewith act as a means of preserving a relatively dense solids column in the lower portion of the conduit.

The operation of the various structures heretofore noted will now be described.

Sufficient aeration gas, e.g. steam, inerts, etc., is introduced through conduits 20, 21, 22 and 30 so as to maintain an upflowing gas velocity of about 0.5 feet per second (based on the cross-sectional area of section 29). Similarly sufficient gas is introduced via tap 35 to maintain 0.5 ft./sec. based on cross-sectional area of section 34. Section 34 is equal in area to section 29. Zone 28 has a cross-sectional area of about 20% less than section 29. As the coarse solids descend from mass 25 at an overall rate in area 28 of about 50 to 100 lbs./sec./ft.$^2$, e.g. 60 lbs./sec./ft.$^2$, they are met by gases introduced by line 32 positioned in section 28, as well as aeration tap 35. The velocity of the upflowing gases in the bottom portion of zone 28 is 1.9 ft./sec. The aeration gases introduced through the above-noted inlet, particularly 32, are roughly effective in maintaining flow control.

However, when it is desired to change the flow rate by small increments or to maintain it at a highly precise value, the present invention dictates the use of draft tube zones 17a, 17b, etc. and their corresponding aeration facilities, i.e. taps 18a, 18b, and tap 20. The narrow confined or draft tube zones 17a, 17b, etc. define a disperse solids pathway leading upwardly from the entranceway to conduit 11, i.e. area 19, to the dilute solids phase 27 of the solids reservoir holdup vessel. Aeration gas is introduced through each of taps 18a, 18b, etc. to form a dilute solids phase in tubes 17a, 17b, etc. having a density of 5 to 25 lbs./ft.$^3$ as compared with a density of 60 to 100 lbs./ft.$^3$ in area 29. The primary means of controlling the solids flow rate through tubes 17a, 17b, etc. will be inlet 20 together with inlets 18a, 18b, etc. While inlets 18a, 18b, etc. serve as the primary means of controlling the carrier gas rate through tubes 17a, 17b, etc. some gas from other taps will also pass through the annularly disposed draft tubes. The amount of gas introduced via inlet 20 and the total quantity of gas passing upwardly through tubes or zones 17a, 17b, etc. are controlled so as to educt and carry a portion of the descending coarse solids passing to conduit 11, and to recycle the educted solids back to the holdup zone where they are returned to solids mass 25. Thus, in the present case wherein it is desired to have a net flow rate of 50 lbs./sec./ft.$^2$ (based on the cross-sectional area of section 29) passing out of conduit 11, 80 lbs./sec./ft.$^2$ of solids descend from mass 25 through area 28, and about 30% of the coarse solids are educted by upflowing gases through draft tubes 17a, 17b, etc. to disperse phase 27 and back to mass 25. For this purpose, a gas velocity of about 20 to 40 ft./sec., e.g. 20 ft./sec., is employed through each of the annular draft tube zones 17a, 17b, etc., and a gas rate of 2.5 ft./sec. is employed in area 19.

Generally, the total cross-sectional area of the zones through which solids are recycled is about 5 to 20% of the cross-sectional area of the discharge terminus of the pathway leading from the holdup zone to the conduit.

If it is desired to decrease the net flow rate of solids through conduit 11, the gas velocity (recycle solids rate) through area 19 and zones 17a, 17b, etc. is increased. Conversely, decreasing the velocity therethrough will increase the net solids rate through the conduit. When employing solids of 400 to 600 microns, doubling the velocity of the gases through areas 19 and zones 17a, 17b, etc. will give a 20% change in the rate of solids passing out of conduit 11.

Reduced cross-sectional area 23 and aeration taps 30 and 22 serve to maintain a solids holdup or dense column in the lower portion of conduit 11 while solids are discharged through conduit section 12 at the rate controlled by the aeration and solids recycling etc. previously described. Sufficient seal gas, e.g. steam, is injected into the base of the conduit to give more than the bulk density (the point at which solids fluidization begins to occur) in the standpipe. The pressure balance is adjusted by valve 24 in inlet line 15 so that an appreciable fraction of the steam will normally flow down from the standpipe along with the coarse solids. Thus in the present example, with a 30 ft. standpipe a pressure differential of 14 p.s.i.g. causes 63% of the steam from taps 22 and 30 to pass upwardly and 37% to pass downwardly through section 28 with the discharging solids. Before any hydrocarbon vapor could flow up into the conduit, e.g. from the reaction zone to which conduit 11 leads, the pressure would have to change enough to force all the seal steam to flow up the standpipe. Formullite particles, the pressure surge required would be 6 p.s.i.g. for a 30 ft. conduit. Normal buildup in the standpipe will be ½ to ⅔ of the maximum bulk density. These conditions are ample protection against flow reversal.

When the flow rate is changed by taps 32 and 20, etc., a new equilbrium level of the dense solids phase in the portion of the standpipe above zone 23 is essentially automatically effected. If, for example, the flow rate of solids descending into conduit section 29 were decreased, the level of the dense phase above section 23 would tend to go down, thus allowing more gas from line 30 to pass upwardly into the conduit, thus decreasing the rate of solids discharge through area 28. Ultimately a balance will be struck and the additional quantity of gas passing upwardly through section 23 will balance the decrease in solids flow rate and a new equilibrium level will be formed.

Upflowing aeration gases are withdrawn overhead through line 15. If desired, valve 24 may be used as a rough means of further control of solids flow by altering the total pressure on solids mass 25.

By way of illustrating the apparatus employed, hopper 19 has a diameter of 10 feet. Draft tubes 17a, 17b, etc. consist of four 5″ pipes spaced 90° apart in plan view. Each pipe has an entrance area with an effection diameter of 20". The inside diameter of exit area 28 is 29 inches. Conduit 11 is 15 to 50 feet long (depending on pressure balance) as measured upwardly from section 23. The enlarged section 36 containing the draft tubes 17a, 17b, etc.) is 5 to 20' long. Tap 21 is placed midway along conduit 11. Tap 22 is located just above the tapered section above slide valve 23. Tap 20 is placed about 1 foot above the entrance 19 to draft tubes 17. Tap 35 is placed about 3 feet above the entrance 19 to draft tubes 17a, 17b, etc. Lines 18a, 18b, etc. are located at the base of each of the four pipes comprising draft tubes 17a, 17b, etc. The straight sided length of element 16 is 8 feet and the length of the sloping section is 17 feet.

Figure 3:
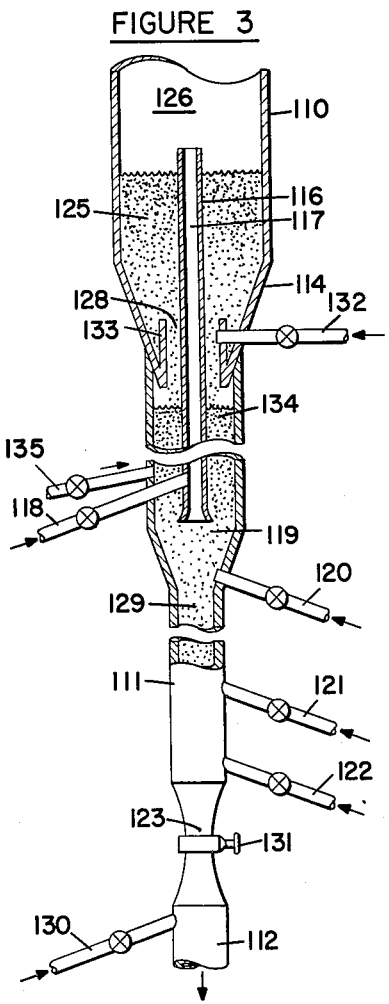
Figure 3 illustrates an alternative means of coarse solids flow control.

With reference to Figure 3, the system shown therein is largely the same as Figure 1, the principal difference lying in the use of a central, disperse phase zone for solids recycling rather than an annular configuration. For simplicity, the upper portion of holdup zone 110 and the solids feed conduit etc. are not shown. Solids are discharged from conduit 111 through outlet 112.

As in Figure 1, positioned along the lower portion of the conduit, above and below reduced cross-sectional area 123, are aeration taps 122 and 130. For safety purpose, open valve 131 is positioned in the lower portion of the conduit, usually near area 123.

Draft tube 116 is located within the solids stream flowing from holdup zone 125 to conduit 111. Tube 116 defines confined zone 117 through which a dilute, rapidly moving solids phase is maintained. It initiates in dilute phase 126 of the holdup vessel and leads downwardly to area 119.

Positioned at its entranceway, much like tap 18 of Figure 1, is aeration conduit 118. Inlet 120 serves as the primary means of controlling the rate of recycle solids eduction into zone 117, and inlet 118 controls the rate of carrying gas flow through zone 117.

As the reservoir solids descend along sloping section 114 through constricted area 128 defined by element 133, they are met by aeration gas introduced through line 132 and 135. Taps 121, 122 and 130 are the equivalent of taps 21, 22, and 30 of Figure 1.

Sections 126, 129 and 134 operate in the same manner as was previously described. Under steady state conditions, a fixed gas rate is maintained through the system, thus educting a fixed proportion of the downflowing coarse solids into zone 117 and returning them to solid mass 125 as indicated by the arrows. Increasing the gas velocity through entrance 119 and zone 117 will decrease the overall solids flow rate out of conduit 111 in the manner previously described.

The system of Figure 1 is normally preferred since better gas-solids contact for solids eduction is had by having solids passing down the center of the path defined between the hopper and conduit.

Tabulated below is a compilation of data applicable to the systems heretofore described.

Table 1

|  | Range | Example |
|---|---|---|
| Solids Size, microns | 400–2000 | 400–600 |
| Solids True Density, lbs./ft.³ | 60–150 | 150 |
| Ultimate Solids Flow Rate, in Conduit, lbs./sec./ft.² | 30–150 | 50 |
| Solids Density in Dilute Phase Riser, lbs./ft.³ | 0–25 | 10 |
| Apparent Solids Density in Conduit, lbs./ft.³ | 30–100 | 67 |
| Solids Recycled to Total Solids Flowing Downwardly from Holdup Zone, Percent | 0–50 | 0–5 |
| Gas Velocity in Conduit | 0.1–3.0 | 0.5 |
| Gas Velocity through Dilute Phase Riser, ft./sec. | 20–40 | 25 |

Though solids are normally continuously fed to the holdup zone, the present invention can be readily used to control solids withdrawal from a fixed solids supply.

Gas rates are merely altered to compensate for the changing solids pressure head.

Various modifications of the present invention will occur to those skilled in the art. Thus instead of, or complementary to, altering the rate of gas introduction to change solids rate through the dilute phase riser, the cross section of the riser itself can be increased or decreased. This can be done by a mechanical seal, adjustment of the riser position, etc. The relative areas of restricted sections 23 and 123, as well as solids discharge areas 28 and 128, may be varied.

Summarily, the present invention permits good control over coarse solids flow rates without necessitating the use of valves, etc., and in a manner resulting in less tendency for solids blockage and attrition than offered by the prior art systems.

What is claimed is:

1. A method for controlling the rate of coarse solids flow down through a vertically arranged conduit section, which comprises, maintaining a mass of coarse solids in a holdup zone positioned above said conduit section, a dilute solids phase being maintained above said solids mass, flowing solids downwardly in response to gravity from said holdup zone into and through said conduit section, introducing gas into the lower portion of said conduit section and flowing it upwardly to impede the flow of solids as well as to seal the atmosphere of said holdup zone from the area below the point of said gas introduction, establishing a confined zone extending upwardly through said descending coarse solids passing to said conduit section, said confined zone extending from about the inlet area of said conduit section to the dilute solids phase above said mass of coarse solids in said holdup zone, and introducing gas upwardly through said confined zone so as to educt only a portion of the downflowing coarse solids from about the inlet of said conduit section and to recycle said educted solids to the upper portion of said holdup zone to control solids flow rate downwardly through said conduit section.

2. The method of claim 1 which further comprises continuously introducing coarse solids to said holdup zone from an extraneous source, and wherein said solids descend through said conduit section as an aerated solids stream.

3. The method of claim 1 wherein said coarse solids are over 400 microns in size and up to 50% of said descending solids are recycled through said confined zone back to said holdup zone.

4. The method of claim 1 wherein an area of reduced horizontal cross section is maintained in the lower portion of the conduit section, and aeration gas is introduced above and below said area of reduced cross section to preserve a dense phase in said conduit section under varying conditions of overall solids flow rate.

5. The method of claim 4 wherein said solids range primarily from 400 to 2000 microns in size.

6. The method of claim 4 wherein the gas introduced into the lower portion of the conduit section is introduced at a plurality of points and serves to seal the conduit section and reservoir zone from the gaseous atmosphere of the areas located below the lowest point of gas introduction.

7. A method according to claim 1 wherein said holdup zone has a restricted bottom outlet and gas is introduced upwardly into said restricted outlet to control flow of solids from said holdup zone.

8. An improved method for regulating the flow of coarse solids over 400 microns in size down through a vertically arranged conduit section at an ultimate rate of about 30 to 150 lbs./sec./ft.², which comprises: establishing a mass of coarse solids in a reservoir zone positioned above said conduit section, flowing said coarse solids downwardly from said reservoir zone to the inlet portion of said conduit section, introducing gas into the lower portion of said conduit section at an overall velocity of about 0.1 to 3.0 feet per second so as to partially impede the flow of descending coarse solids, establishing a confined zone along the path of said coarse solids flowing down from said reservoir zone to said conduit section, said confined zone extending from about the inlet portion of said conduit section to above said solids mass in said reservoir zone, introducing gas upwardly through said confined zone at a velocity of about 20 to 40 feet per second so as to educt only a portion of said downflowing solids and recycle them to the area above said solids mass in said reservoir zone, the rate of solids flow through said confined zone thereby being maintained in the range of up to 50% of the net downward solids flow through said inlet portion; establishing an area of reduced horizontal cross section in a lower portion of said conduit section, and introducing aeration gas above and below said area so as to preserve a dense solids phase in said conduit section while controlling the flow rate of solids down through said conduit section.

9. A method according to claim 8 wherein said reservoir zone has a restricted bottom outlet and gas is introduced upwardly into said restricted outlet to control flow of solids from said reservoir zone.

References Cited in the file of this patent

UNITED STATES PATENTS

| | | |
|---|---|---|
| 1,971,716 | Hitchcock | Aug. 28, 1934 |
| 2,529,583 | Adams | Nov. 14, 1950 |
| 2,571,277 | Morrow | Aug. 16, 1951 |
| 2,613,832 | Ogorzaly | Oct. 14, 1952 |

FOREIGN PATENTS

| | | |
|---|---|---|
| 166,160 | Australia | Nov. 29, 1955 |